United States Patent [19]

Roovers et al.

[11] Patent Number: 4,965,308

[45] Date of Patent: Oct. 23, 1990

[54] POLYMER MIXTURE COMPRISING AN AROMATIC POLYCARBONATE, AN AROMATIC POLYESTER AND AN INORGANIC SULFUR COMPOUND

[75] Inventors: Wilhelmus M. M. Roovers, Steenbergen, Netherlands; Jeroen J. Verhoeven, Antwerpen, Belgium

[73] Assignee: General Electric Company, Pittsfield, Mass.

[21] Appl. No.: 198,365

[22] Filed: May 25, 1988

[51] Int. Cl.$^5$ .............................................. C08K 3/30
[52] U.S. Cl. ................................ 524/421; 524/422; 524/423
[58] Field of Search ............... 524/403, 404, 406, 410, 524/413, 415, 418, 419, 420, 421, 422, 423; 525/439

[56] References Cited

U.S. PATENT DOCUMENTS

| | | | |
|---|---|---|---|
| 2,999,835 | 9/1961 | Goldberg | 524/267 |
| 3,028,365 | 4/1962 | Schnell et al. | 528/171 |
| 3,153,008 | 10/1964 | Fox | 528/196 |
| 3,169,121 | 2/1965 | Goldberg | 528/173 |
| 3,334,154 | 8/1967 | Kim | 525/469 |
| 3,856,746 | 12/1974 | Susuki et al. | 524/418 |
| 3,936,400 | 2/1976 | Wambach | 524/410 |
| 4,001,184 | 1/1971 | Scott | 528/182 |
| 4,028,297 | 6/1977 | Webb | 524/419 |
| 4,098,750 | 7/1978 | Mark et al. | 260/30.8 R |
| 4,123,436 | 10/1978 | Holub et al. | 260/30.8 R |
| 4,131,575 | 12/1978 | Adelmann et al. | 524/311 |
| 4,284,550 | 8/1981 | Mizuno et al. | 524/423 |
| 4,408,005 | 10/1983 | Byrne | 524/418 |
| 4,452,933 | 6/1984 | McCready | 524/291 |
| 4,510,196 | 4/1985 | Carter | 524/423 |
| 4,521,560 | 6/1985 | Breitenfellner | 524/423 |
| 4,626,563 | 12/1986 | Ogoe et al. | 524/423 |
| 4,639,481 | 1/1987 | Giles, Jr. | 525/128 |
| 4,654,400 | 3/1987 | Lohmeijer et al. | 525/64 |
| 4,657,973 | 4/1987 | Endo et al. | 525/439 |
| 4,677,150 | 6/1987 | Chacko et al. | 525/451 |
| 4,687,802 | 8/1987 | Hepp | 524/418 |
| 4,701,516 | 10/1987 | Rosenquist | 528/176 |
| 4,707,511 | 11/1987 | Boutni | 524/311 |
| 4,710,534 | 12/1987 | Liu | 524/411 |

FOREIGN PATENT DOCUMENTS 215050 10/1985 Japan .
8700542 1/1987 PCT Int'l Appl. .
1466154 3/1977 United Kingdom .

*Primary Examiner*—Veronica P. Hoke
*Attorney, Agent, or Firm*—William F. Mufatti

[57] ABSTRACT

The invention relates to polymer mixtures which comprise an aromatic polycarbonate and an aromatic polyester. The polymer mixtures are stabilized by the addition of a sulphurous compound.

13 Claims, No Drawings

POLYMER MIXTURE COMPRISING AN AROMATIC POLYCARBONATE, AN AROMATIC POLYESTER AND AN INORGANIC SULFUR COMPOUND

The invention relates to a polymer mixture which comprises the following constituents:
A. 1–98.99%, by preference 6–93.99%, by weight of an aromatic polycarbonate,
B. 98.99–1%, by preference 6–93.99%, by weight of an aromatic polyester, and
C. 0.01–5% by weight of a stabiliser.

It is known, for example, from GB-A-1466154 that polymer mixtures which comprise an aromatic polycarbonate and an aromatic polyester show a certain instability. Probably, a transesterification reaction occurs in such mixtures.

It is proposed in GB-A-1466154 to suppress said transesterification by the addition of a phosphorus-containing compound, for example, triphenyl phosphite, phosphorous acid.

The invention is based on the discovery that a further improvement of the stability can be obtained.

The use of inorganic sulphurous stabilisers results in a slightly improved stability as compared with the known phosphorus-containing stabilisers.

The known phosphorus-containing stabilisers have the additional disadvantage that they show only a small stabilising activity in polymer mixtures which moreover comprise one or more pigments, for example, ultramarine blue and titanium dioxide. It has quite unexpectedly been found that the stabilisers according to the invention also have a good activity in the presence of pigments.

JP-A-60-215050 describes polymer blends comprising 30–98.985% by weight of polyethylene terephthalate, 1–60% by weight glass fibres, a thioetherester of a specific formula and 0.005–5% by weight of a polycarbonate. The addition of the glass fibres, the thioetherester and the polycarbonate are claimed to reduce the sink marks and to improve the appearance of polyethylene based compositions. This is not related with the prevention of transesterification of aromatic polycarbonate/aromatic polyester blends as claimed in this application. Applicant further found that similar thioetheresters do not prevent transesterification.

WO-87/00542 describes the addition of a metal salt of an aromatic sulfimide together with a metal sulfate or bisulfate to carbonate polymers. Such addition is claimed to prevent reduction in molecular weight of the carbonate polymer during melt shearing. This is a phenomenum not related to transesterification.

The polymer mixture according to the invention may comprise 0.01–5% by weight, preferably 0.05–0.5% by weight, of a metal sulphate as a stabiliser. A suitable metal sulphate is zinc sulphate. Compared with the known phosphorus-containing stabilisers, the said sulphate has the advantage of being recorded on the list of compounds approved of by FDA for contact with foodstuffs.

It is possible to use sulphuric acid or sulphurous acid as a stabiliser in the polymer mixtures according to the invention, preferably in a quantity from 0.01 to 1% by weight. This quantity by weight applies to a solution of 45% by volume. In the case of higher or lower concentrations the quantity by weight should be adapted accordingly.

As a stabiliser may further be used, for example, metal sulphites, metal bisulphites, metal hydrogen sulphates or metal thiosulphates.

The invention also relates to articles formed from the polymer mixtures according to the invention.

So the polymer mixture according to the invention comprises at any rate the following constituents in the above-indicated quantities:
A. aromatic polycarbonate,
B. aromatic polyester,
C. an inorganic sulphurous compound as a stabiliser.

The polymer mixture according to the invention may moreover comprise one or more of the following constituents:
D. one or more pigments
E. conventional additives.

A. Aromatic polycarbonate

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

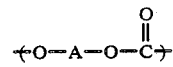

wherein A is a bivalent aromatic radical derived from the dihydric phenol used in the preparation of the polymer. Mononuclear or polynuclear aromatic compounds which comprise two hydroxy radicals which are each directly bonded to a carbon atom of an aromatic nucleus may be used as dihydric phenols in the preparation of the aromatic polycarbonates.

Examples of suitable dihydric phenols are: 2,2-bis-(4-hydroxyphenyl)propane; hydroquinone; resorcinol; 2,2-bis-(4-hydroxyphenyl)pentane; 2,4'-(dihydroxydiphenyl)methane; bis(2-hydroxyphenyl)methane; bis-(4-hydroxyphenyl)methane; bis-(4-hydroxy-5-nitrophenyl)methane; 1,1-bis-(4-hydroxyphenyl)ethane; 3,3-bis(4-hydroxyphenyl)pentane; 2,2-dihydroxy-phenyl; 2,6-dihydroxynaphthalene; bis-(4-hydroxydiphenyl)sulphone; bis-(3,5-diethyl-4-hydroxyphenyl)sulphone; 2,2-bis-(3,5-dimethyl-4-hydroxyphenyl)propane; 2,4'-dihydroxyphenyl sulphone; 5'-chloro-2,4'-dihydroxydiphenyl sulphone; bis-(4-hydroxyphenyl) diphenyl sulphone; 4,4'-dihydroxydiphenyl ether; 4,4'-dihydroxy-3,3'-dichlorodiphenyl ether; 4,4'-dihydroxy-2,5-dihydroxy diphenyl ether.

Other dihydric phenols which are also suitable are described in U.S. Pat. Nos. 2,999,835; 3,028,365; 3,334,154, and 4,131,575.

The aromatic polycarbonates can be prepared according to methods known per se: for example, by reacting a dihydric phenol with a carbonate precursor, for example, phosgene. For this purpose, reference may be made to the just-mentioned United States Patent Specifications and to U.S. Pat. No. 4,098,750 and 4,123,436. They may also be prepared by a transesterification as described in U.S. Pat. No. 3,153,008.

The known branched polycarbonates as described for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional esterforming derivative thereof. These polyester carbonates have ester compounds and carbonate compounds in the polymeric chain. Polyester carbonates are described, for example, in U.S. Pat. No. 3,169,121.

In the polymer mixtures according to the invention it is also possible to use as an aromatic polycarbonate a mixture of various polycarbonates as mentioned hereinbefore.

B. Aromatic polyester

Any known aromatic polyester may be used in the polymer mixtures according to the invention. Polyesters which are particularly suitable are the polyalkylene terephthalates.

Polyalkylene terephthalates are compounds known per se. They may be described as glycol esters of terephthalic acid. They may be prepared, for example, by alcoholysis of esters of terephthalic acid with a glycol succeeded by a polymerisation reaction, by heating glycol compounds with free acids or derivatives thereof. The glycol part of the polyalkylene terephthalates may comprise from 2 to 10 carbon atoms; it preferably comprises from 2 to 4 carbon atoms in the form of linear alkylene chains.

Polyesters are preferably used which are derived from ethylene glycol or butane-1,4-diol and terephthalic acid. It is also possible to use copolyesters in which a part of the said glycol and/or of the terephthalic acid is replaced by another glycol and/or aromatic carboxylic acid. In general, not more than 30 mol. %, preferably not more than 10 mol. %, of the glyco and/or terephthalic acid is replaced by other comonomers in such copolyesters.

It is also possible to use so-called block copolyesters as a polyalkylene terephthalate. These block copolyesters are prepared, for example, by converting a polybutylene terephthalate with reactive terminal groups with a reactive polyester or copolyester in the presence of a transesterification catalyst.

It is further possible to incorporate a branching agent in the polyalkylene terephthalate, for example, a glycol having three or more hydroxyl groups or a trifunctional or polycarboxylic acid.

It is also possible to use a mixture of various polyesters as the polyester.

C. Sulphurous compound as a stabiliser

The polymer mixture according to the invention comprises an inorganic sulphurous compound as a stabiliser. Suitable sulphurous compounds are, for example, metal sulphates, for example, zinc sulphate, sulphuric acid, sulphurous acid, metal sulphites, metal bisulphites, metal hydrogen sulphate and metal thiosulphates. The stabiliser may be used in a quantity from 0.01–5% by weight. Metal sulphates are preferably used in a quantity from 0.05–0.5% by weight of sulphuric acid and sulphurous acid in a quantity of preferably 0.01–1% by weight.

In addition to the constituents mentioned hereinbefore sub A, B and C, the polymer mixtures according to the invention may comprise one or more of the following constituents:

D. Pigments

The stabilisers as used in the polymer mixtures according to the invention have the advantage that they do not lose, or that they hardly lose, their effect in the presence of pigments.

Therefore, the polymer mixtures according to the invention may comprise one or more pigments, for example, ultramarine blue and titanium dioxide.

E. Conventional additives

The polymer mixture according to the invention may comprise as additives, for example, polyolefins, mould-release agents, agents to improve the flame-retarding properties, further stabilisers, for example, thermal stabilisers, dyes, fillers and reinforcing fillers, for example, glass fibres.

More in particular, the polymer mixture according to the invention may also comprise a combination of several of the various additives mentioned hereinbefore.

The polymer mixture according to the invention preferably comprises a weight ratio of the quantity of polycarbonate (A) to aromatic polyester (B) between 1:8 and 8:1.

The polymer mixture according to the invention may be prepared according to conventional methods of preparing polymer mixtures, for example, by melt extrusion.

The invention will now be described in greater detail with reference to the ensuing specific examples:

Comparative examples A, B, C and D, examples I, II, III and IV.

Eight polymer mixtures were prepared having a composition as recorded in Table I hereinafter. The constituents used were as follows:

PBT: Polybutyleneterephthalate having an intrinsic viscosity of 1.18 dl/g measured in a 60/40 mixture of phenol and 1,1,2,2,-tetrachloroethane at 25° C.

PC: Polycarbonate derived from bisphenol A and phosgene having an intrinsic viscosity of 53.0 ml/g measured in methylene chloride ($CH_2CL_2$) at 25° C.

FOS: Phosphite, namely a mixture of various aromatic and aliphatic phosphites.

SULF: Zinc sulphate $H_2SO_3$: sulphurous acid (45% by vol. in water)

$H_2SO_4$: Sulphuric acid (45% by volume in water)

Pigment: Ultramarine blue: pigment blue 29

$TiO_2$: Titanium dioxide.

The indicated constituents were extruded together on a double-blade extruder at a melting temperature of approximately 285° C. and a speed of 200 rpm.

The stability against transesterification was determined as follows. Test pieces for determining the Vicat-B value according to DIN 53460 were injection-moulded from the polymer mixtures according to Examples I, II, III and IV and according to comparative examples A, B, C and D. The test pieces were injection-moulded under extra heavy conditions (285° C., residence time 6 minutes). In a transesterification reaction, products are formed with a lower Vicat value as compared to the Vicat value of the polycarbonate resin. This results in an overall reduction of the Vicat value of the blend.

So a lower Vicat value indicates a transesterification: the higher the Vicat, the stabler the polymer mixture.

The resulting test pieces were also evaluated visually with regard to surface defects (so-called "splay"). Such surface defects often occur as a result of transesterification reactions.

The results found are recorded in Table I.

TABLE I

| Example | A | B | C | D | I | II | III | IV |
|---|---|---|---|---|---|---|---|---|
| Composition (parts by weight) | | | | | | | | |
| PBT | 45 | 43 | 45 | 43 | 45 | 45 | 45 | 43 |
| PC | 55 | 53 | 55 | 55 | 55 | 55 | 55 | 55 |
| Fos | — | — | 0.2 | 0.2 | — | — | — | — |
| Sulf | — | — | — | — | 0.4 | — | — | 0.2 |
| $H_2SO_3$ | — | — | — | — | — | 0.09 | — | — |
| $H_2SO_4$ | — | — | — | — | — | — | 0.11 | — |
| Pigment | — | — | 3.5 | — | 3.5 | — | — | 3.5 |
| $TiO_2$ | — | 0.5 | — | 0.5 | — | — | — | 0.5 |
| Properties | | | | | | | | |
| Vicat B (°C) | 80 | 80 | 124 | 97 | 127 | 120 | 120 | 126 |
| Splay* | + | + | — | + | — | — | — | — |

*— no or slight "splay"; + strong splay

It may be seen from the results of Table I that the polymer mixtures according to the invention (examples I, II, III and IV) generally have the same to a slightly better stability than the comparative polymer mixtures A, B, C and D.

It strikes in particular that the polymer mixture according to example D has a much worse stability than the corresponding example IV according to the invention. The known phosphite stabiliser obviously loses its activity in the presence of pigments. The stabiliser according to the invention does not exhibit said disadvantage.

We claim:

1. A polymer mixture which comprises the following constituents:
   A. 1–98.99% by weight of an aromatic polycarbonate,
   B. 98.99–1% by weight of an aromatic polyester, and
   C. 0.01–5% by weight of a stabiliser, characterised in that the polymer mixture comprises sulphuric acid or sulphurous acid as the stabiliser.

2. A polymer mixture as claimed in claim 1, wherein the mixture comprises
   A. 6–93.99 by weight of an aromatic polycarbonate,
   B. 6–93.99% by weight of an aromatic polyester, and
   C. 0.01–5% by weight of a stabiliser, characterised in that the polymer mixture comprises sulphuric acid or sulphurous acid as the stabiliser.

3. A polymer mixture as claimed in claim 1, characterised in that the polymer mixture comprises in addition a pigment.

4. A polymer mixture as claimed in claim 2, characterised in that the polymer mixture comprises ultramarine blue as a pigment.

5. A polymer mixture as claimed in claim 1, characterised in that the polymer mixture further comprises in addition one or more additives selected from the group consisting of mold release agent, flame retardant, stabilizer, reinforcing filler, dye and filler.

6. A polymer mixture as claimed in claim 1, characterised in that the polymer mixture comprises 0.01–1% by weight of sulphuric acid or sulphurous acid as a stabiliser.

7. Articles formed from the polymer mixture as claimed in claim 1.

8. A polymer mixture which comprises the following constituents:
   A. 1–98.99% by weight of an aromatic polycarbonate,
   B. 98.99–1% by weight of an aromatic polyester, and
   C. 0.01–5% by weight of a stabiliser, characterised in that the polymer mixture comprises a metal bisulphite, a metal hydrogen sulphate or a metal thio sulphate as the stabiliser.

9. A polymer mixture as claimed in claim 8, wherein the mixture comprises
   A. 6–93.99% by weight of an aromatic polycarbonate,
   B. 6–93.99% by weight of an aromatic polyester, and
   C. 0.01–5% by weight of a stabiliser, characterised in that the polymer mixture comprises a metal bisulphate, a metal hydrogen sulphate or a metal thio sulphate as the stabiliser.

10. A polymer mixture as claimed in claim 8, characterised in that the polymer mixture comprises in addition a pigment.

11. A polymer mixture as claimed in claim 9, characterised in that the polymer mixture comprises ultramarine blue as a pigment.

12. A polymer mixture as claimed in claim 8, characterised in that the polymer mixture further comprises in addition one or more additives selected from the group consisting of mold release agent, flame retardant, stabilizer, reinforcing filler, dye and filler.

13. Articles formed from the polymer mixture as claimed in claim 8.

* * * * *